United States Patent [19]

Crome

[11] Patent Number: 5,170,814
[45] Date of Patent: Dec. 15, 1992

[54] HIGH ALTITUDE G-VALVE

[75] Inventor: Victor P. Crome, Davenport, Iowa

[73] Assignee: Litton Systems, Inc., Davenport, Iowa

[21] Appl. No.: 838,138

[22] Filed: Feb. 18, 1992

[51] Int. Cl.⁵ .............................................. B64D 10/00
[52] U.S. Cl. ................................. 137/39; 137/81.1; 600/20
[58] Field of Search ............... 137/38, 39; 600/19, 600/20

[56] References Cited

U.S. PATENT DOCUMENTS

| | | | |
|---|---|---|---|
| Re. 25,508 | 1/1964 | Cramer | 600/19 |
| 2,952,264 | 9/1960 | Burns | 137/39 |
| 3,430,642 | 3/1969 | Mack | 137/39 |
| 3,734,078 | 5/1973 | Cramer | 128/1 A |
| 3,752,175 | 8/1973 | Hamilton | 137/81.1 |
| 4,638,791 | 1/1987 | Krogh et al. | 128/1 A |
| 4,674,479 | 6/1987 | Jennings et al. | 128/1 A |
| 4,858,606 | 8/1989 | Hamlin | 128/204.29 |
| 4,895,320 | 1/1990 | Armstrong | 244/118.5 |
| 5,007,893 | 4/1991 | Row | 600/20 |

Primary Examiner—Robert G. Nilson
Attorney, Agent, or Firm—Brian L. Ribando

[57] ABSTRACT

A high altitude G-valve produces a pressure signal in response to altitude and G-load without a connection to an external altitude sensing device. Bleed path pressure regulation by an aneroid valve and a G-sensing valve control a pilot valve which in turn controls a main valve. The main valve provides regulated air to the G-valve outlet in response to the pilot valve. A manually actuated button simulates a high-G load on the G-sensing valve to test the operation of the device.

8 Claims, 1 Drawing Sheet

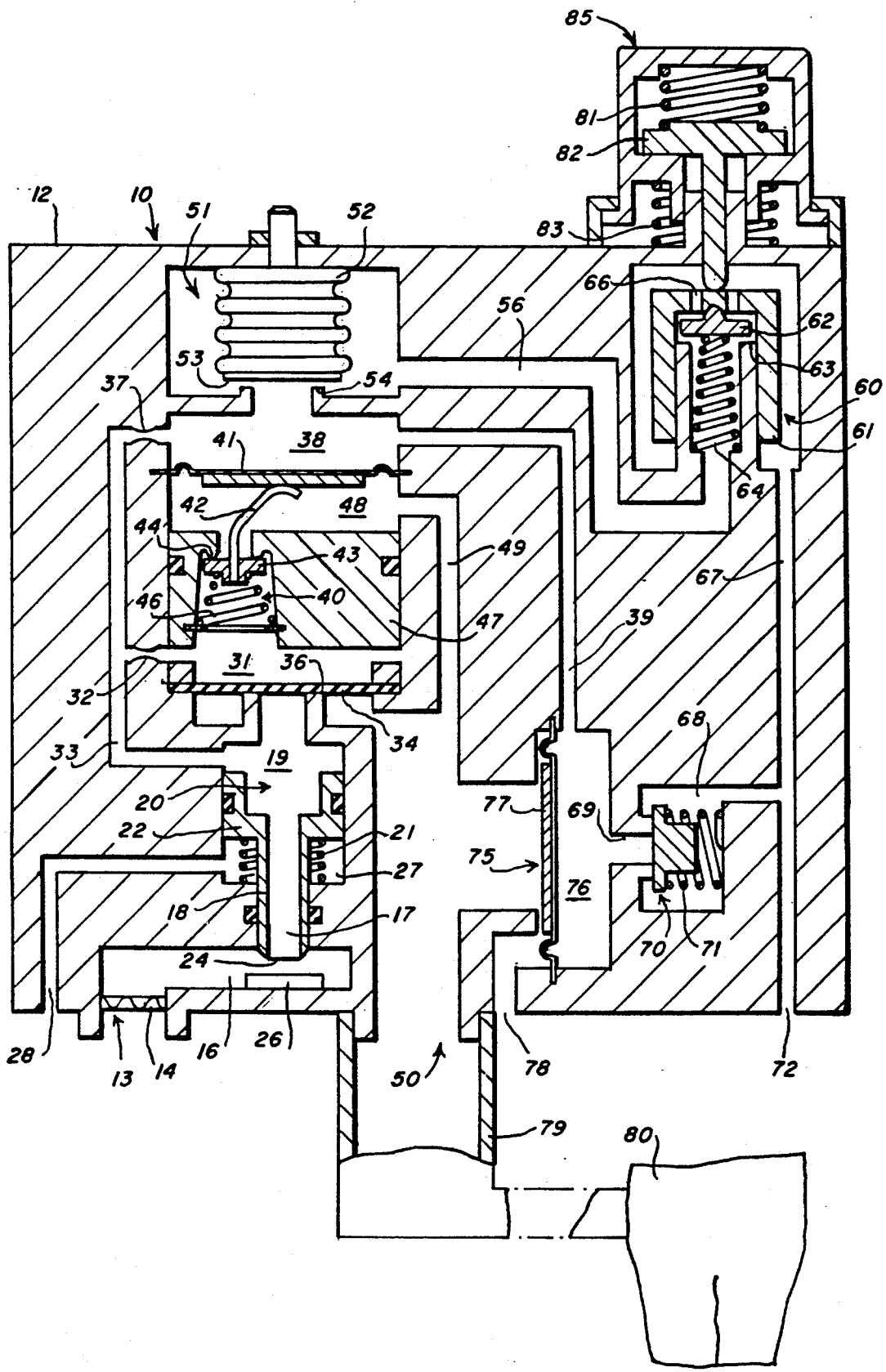

HIGH ALTITUDE G-VALVE

BACKGROUND OF THE INVENTION

The invention relates to a high altitude G-valve which is used to control inflation of a pilot's G-pants in response to both altitude and G-force.

It is known that pressurizing a lower anti-G garment (G pants) in conjunction with breathing at elevated gauge pressure increases the amount of time a pilot can withstand low surrounding ambient pressure. The pressure in the G-pants improves the return of blood from the legs to the heart by reducing the pooling of blood in the lower extremities caused by pressure breathing.

It is also known that the inflation pressure in the G-pants should be varied both as a function of G-load and altitude in order to provide maximum protection for the pilot.

Combination breathing regulators and anti-G garmet valves (BRAG valves) which perform this function are known in the art. BRAG valves operate by delivering a signal from a G-valve which is a function of a pressure signal received from a breathing regulator. Since the breathing regulator pressure signal is dependent on altitude, the BRAG valve produces a signal which is a function of both G-load and altitude. This arrangement requires communication between the breathing regulator and the anti-G valve. In some cases, it has been proposed to mount the two units adjacent to one another so that the need for auxiliary coupling hardware and the attendant added complexity and cost could be avoided. Modern fighter aircraft cockpits are already crowded however, and it is often impossible to find the necessary panel space in which to mount such a combination unit. Alternate solutions separate the two units to locations where smaller panel spaces are available, but electrical or pneumatic communication lines are still required and the complexity, cost and weight of the coupling hardware are strong deterrents to this approach.

It would accordingly be desirable to provide a G-valve used to control the pressure in a pilot's G-pants which varies its output as a function of altitude without the space and cost disadvantages associated with the use of a separate breathing regulator in conjunction with the G-valve.

SUMMARY AND OBJECTS OF THE INVENTION

According to the invention, a G-valve provides an output signal which is a function of altitude through the use of an aneroid which is mounted directly in the G-valve body. The aneroid elongates in response to reduced ambient pressure and restricts a bleed path through the G-valve which allows air under pressure to flow to the G-valve outlet for use in pressurizing a pilot's G-pants. The G-valve includes a means for limiting the maximum pressure which can be applied to the G-pants and a means for venting pressure in the pants in the event of a sudden loss of cabin pressure.

It is accordingly an object of the invention to provide a G-valve for controlling the inflation of a pilot's G-pants which varies the inflation pressure as a function of altitude without the requirement of an external altitude sensing device.

It is another object of the invention to provide a G-valve for controlling the inflation of a pilot's G-pants as a function of both G-force and altitude which does not require communication between the G-valve and a separate breathing regulator or altimeter.

These and other objects of the invention will be apparent from the following detailed description in which reference numerals used throughout the description correspond to numerals appearing on the drawing figure.

BRIEF DESCRIPTION OF THE DRAWINGS

A single drawing figure shows a high altitude G-valve according to the invention.

DESCRIPTION OF THE PREFERRED EMBODIMENT

Referring to the single drawing figure, a high altitude anti-G valve is generally shown by the reference numeral 10. The anti-G valve comprises a body 12 having an inlet 13, a pressure regulator or reducer 20, a main valve 30, a pilot valve 40, an aneroid valve 51, a G-sensing valve 60, an anti-G relief valve 70, a compensated relief valve 75, and an outlet 50. The outlet 50 is coupled to a pilot's G-pants 80.

The inlet 13 includes an inlet filter 14 located at the entrance of an inlet passage 16 leading to a passage 17 formed in the stem 18 of the control member 22 of the pressure reducer 20. The passage 17 leads to the control chamber 19 of the pressure reducer 20 and a spring 21 opposes downward motion of the control member 22. Sufficient pressure in the control chamber 19 causes downward motion of the control member 22 until the inlet 24 of the passage 17 is closed against the stop 26. A vent chamber 27 on the side of the control member 22 opposite the control chamber 19 is vented to ambient by a vent passage 28.

The control pressure from the pressure reducer 20 is coupled to the main valve chamber 31 of the main valve 30 through the main valve orifice 32 in the control passage 33. The main valve diaphragm 34 is normally closed against the main valve seat 36 and prevents flow from the control chamber 19 to the outlet 50. The control passage 33 also leads to a pilot orifice 37 and to a pilot valve control chamber 38 for the pilot valve 40. The control chamber 38 is coupled to the compensated relief valve control chamber 76 by a line 39. A pilot valve diaphragm 41 rests against the control lever 42 of the pilot valve 40 which includes a valve element 43 normally held closed against the pilot valve seat 44 by a pilot valve spring 46. The pilot valve assembly is positioned in a pilot valve body 47 which is movable relative to the G-valve body 12. A pilot valve chamber 48 formed between the pilot valve diaphragm 41 and the pilot valve body 47 is coupled by a pilot valve outlet 49 to the G-valve outlet 50. An aneroid valve 51 is formed by an evacuated bellows 52 which controls the position of an aneroid valve element 53 relative to a seat 54. The aneroid valve 51 is normally open allowing flow through an aneroid control passage 56 to the G-sensing valve 60.

The G-sensing valve 60 comprises a G-sensing mass 61 positioned over a G-valve element 62 which is opposite a seat 63 and is normally held open by a G-sensing valve spring 64. A pair of passageways 66 in the G-sensing mass 61 allows flow through the G-valve to the vent passage 67 which is coupled to ambient via a vent 72 and to an anti-G relief valve chamber 68. The anti-G relief valve 70 in the chamber 68 is normally held closed against the valve seat 69 by a spring 71. A normally open compensated relief valve 75 includes the control chamber 76 coupled to the control chamber 38 of the pilot valve 40 by the line 39. An outlet vent 78 couples the main outlet 50 to ambient through a passage which is normally open and is controlled by the diaphragm 77 of the normally open compensated relief valve 75.

The outlet 50 is coupled by a pressure hose 79 to the pilot's G-pants 80. A test button 85 encloses a spring 81 which is in contact with an actuator 82, the lower end of which contacts the top of the G-sensing mass 61 when actuated. The test button 85 is normally held in the UP position by a return spring 83, and may be manually depressed to simulate a G-load.

METHOD OF OPERATION OF THE PREFERRED EMBODIMENT

Bleed air from the engine is supplied to the anti-G valve 10 through the inlet filter 14 and the inlet passage 16 to the pressure reducer 20. The pressure reducer regulates downstream pressure and pressurizes the main valve chamber 31 through the main valve orifice 32 holding the main valve 30 closed to prevent air flow to the outlet 50. The pressure reducer also supplies the control chamber 38 of the pilot valve 40 and the control chamber 76 of the compensated relief valve 75. At low altitude and G-force levels, the pressure in the control chamber bleeds 38 past the open aneroid valve 51 and through the open G-valve 60 to ambient through the port 72.

As the unit is subjected to increasing acceleration (G) levels, the G-sensing mass 61 applies increasing force to the spring 64 lowering the G-valve element 62 toward the seat 63 restricting the bleed path from the control chamber 38 to ambient through the vent 72. This increases the pressure in the control chambers 38 and 76, closing the outlet vent 78 and forcing the pilot valve control diaphragm 41 downward against the control lever 42. The control lever 42 opens the pilot valve 40 which vents the control pressure from the chamber 31 above the main valve. Reducing the control pressure in chamber 31 allows the main valve diaphragm 34 to be pushed away from the seat 36, allowing the regulated gas in the control chamber 19 to flow to the outlet 50. Increasing pressure in the outlet 50 pressurizes the pilot's G-pants 80 through the pressure hose 79. When the pressure at the outlet 50 equals the pressure in the control chamber 38, the pilot valve control diaphragm 41 returns to its neutral position and the main valve 30 closes to stop the flow of regulated gas from the control chamber 19 to the outlet.

At increasing altitude, the aneroid 51 restricts the bleed path from the control chamber 38 to ambient through the vent 72. As the aneroid elongates, the opening between the aneroid valve element 53 and the seat 54 is restricted, increasing the pressure in the control chambers 38 and 76, closing the outlet vent 78 and opening the pilot valve 40. This vents the pressure in the control chamber 31, allowing gas to flow past the seat 36 into the outlet 50 and into the pilot's G-pants 80.

Maximum pressure in the G-pants 80 is limited by the anti-G relief valve 70 which opens against the spring 71 to relieve excess pressure in the compensated relief valve chamber 76, thus opening the vent passage 78 and venting excess pressure in the outlet 50.

The compensated relief valve 75 also vents excess pressure from the G-pants during aircraft cabin decompression and after a period of pressurizing the G-pants 80 during high-G maneuvers. Decompression causes a pressure drop at vent port 72 and this reduced pressure is transmitted to the pilot valve control chamber 38 through the vent passage 67, the G-valve 60, and the aneroid control passage 56. The low pressure in the chamber 38 is coupled to the control chamber 76 of the compensated relief valve 75 which allows the diaphragm 77 to open the outlet port 78 to ambient. Pressure in the G-pants will vent through the hose 79 to ambient through the outlet port 78.

The self-test button 85 allows the pilot to conduct a preflight check of the valve assembly by simulating a high-G condition on the G-sensing mass 64 via the controlled force applied to the mass 64 by the test spring 81 when the button 85 is depressed.

Having thus described the invention, various modifications and alterations will occur to those skilled in the art, which modifications and alterations are intended to be within the scope of the invention as defined by the appended claims.

What is claimed is:

1. A high altitude G-valve which provides an output pressure which is a function of G-load and altitude without connection to an external altitude sensing device comprising:
   an air inlet and a G-valve outlet;
   a main valve for controlling the flow of air from the air inlet to the G-valve outlet;
   a pilot valve for controlling the opening and closing of the main valve;
   a control chamber for the pilot valve and a bleed path from the control chamber to ambient;
   an altitude responsive means for restricting bleed path flow to ambient in response to ambient pressure; and
   a G-force responsive means for restricting bleed path flow to ambient in response to sensed G-load whereby a restriction to bleed path flow by the altitude responsive means or the G-force responsive means causes a pressure increase in the control chamber and a flow of air from the air inlet to the G-valve outlet.

2. The high altitude G-valve of claim 1 further comprising:
   an aneroid valve comprising the altitude responsive means, said aneroid valve comprising an aneroid valve element and an opposed seat, whereby a change in ambient pressure causes a change in the bleed path restriction between the aneroid valve element and the opposed seat.

3. The high altitude G-valve of claim 2 further comprising:
   a G-sensing valve comprising the G-force responsive means, said G-sensing valve comprising a G-sensing mass and a G-valve element which moves with the G-sensing mass, whereby a change in sensed G-load causes a change in restriction to bleed flow past the G-valve element.

4. The high altitude G-valve of claim 3 further comprising:
   a pressure reducer at the air inlet, said pressure reducer delivering air at a regulated pressure to the main valve and to the remainder of the G-valve assembly.

5. The high altitude G-valve of claim 3 further comprising:
   an actuator for depressing the G-sensing mass and a spring coupling the actuator to a manually activated button, whereby the application of a manual force to the button causes the application of a controlled force to the G-sensing mass by the spring.

6. The high altitude G-valve of claim 5 further comprising:
   vent means in the G-sensing mass, said vent means comprising a portion of the bleed path from the control chamber to ambient.

7. A high altitude G-valve which provides an output pressure which is a function of altitude and G-load without connection to an external G-sensing device comprising:
   a pressure regulator having a source of bleed air;
   a main valve for controlling the flow of air from the pressure regulator to the G-valve outlet;
   a pilot valve for controlling the opening and closing of the main valve;
   a pilot valve control chamber and a pilot valve diaphragm separating the pilot valve control chamber from a pilot valve chamber;
   a pilot valve outlet coupling the pilot valve chamber to G-valve outlet;
   a bleed path coupling the pilot valve control chamber to ambient;
   altitude responsive means for controlling bleed path flow in response to ambient pressure; and
   G-responsive means for restricting the bleed path in response to a sensed G-load whereby a bleed path restriction causes an increase in pressure in the pilot valve control chamber causing the main valve to open and air to flow from the pressure regulator to the G-valve outlet.

8. The high altitude G-valve of claim 7 further comprising:
   an aneroid valve comprising the altitude responsive means, said aneroid valve comprising an evacuated bellows, an aneroid valve element and a seat, whereby an increase in altitude causes a restriction in the bleed path between the aneroid valve element and the seat.

* * * * *